(12) United States Patent
D'Alessandro

(10) Patent No.: US 8,036,317 B2
(45) Date of Patent: Oct. 11, 2011

(54) PHASE/GAIN IMBALANCE ESTIMATION OR COMPENSATION

(75) Inventor: Pierluigi D'Alessandro, Nürnberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 821 days.

(21) Appl. No.: 10/536,641

(22) PCT Filed: Nov. 28, 2003

(86) PCT No.: PCT/IB03/05779
§ 371 (c)(1),
(2), (4) Date: May 27, 2005

(87) PCT Pub. No.: WO2004/054194
PCT Pub. Date: Jun. 24, 2004

(65) Prior Publication Data
US 2006/0039506 A1    Feb. 23, 2006

(30) Foreign Application Priority Data
Dec. 9, 2002   (EP) .................................. 02102707

(51) Int. Cl.
*H04L 27/00* (2006.01)
(52) U.S. Cl. ........................................................ 375/324
(58) Field of Classification Search .............. 375/324, 375/261, 297, 147; 455/324, 147; 714/408
See application file for complete search history.

(56) References Cited

U.S. PATENT DOCUMENTS

| | | | |
|---|---|---|---|
| 6,289,048 B1* | 9/2001 | Richards et al. ............... | 375/235 |
| 6,297,691 B1* | 10/2001 | Anderson et al. ............. | 329/300 |
| 6,442,217 B1* | 8/2002 | Cochran ........................ | 375/326 |
| 6,934,341 B2* | 8/2005 | Sahlman ........................ | 375/297 |
| 6,940,916 B1* | 9/2005 | Warner et al. ................. | 375/261 |
| 2002/0097812 A1* | 7/2002 | Wiss .............................. | 375/316 |
| 2002/0131480 A1* | 9/2002 | Sousa et al. ................... | 375/147 |
| 2002/0159539 A1* | 10/2002 | Alcock et al. ................. | 375/279 |
| 2003/0021367 A1* | 1/2003 | Smith ........................... | 375/346 |
| 2003/0040292 A1* | 2/2003 | Peterzell et al. .............. | 455/147 |
| 2003/0045249 A1* | 3/2003 | Nielsen ......................... | 455/118 |
| 2003/0095529 A1* | 5/2003 | Petre et al. .................... | 370/342 |
| 2003/0139167 A1* | 7/2003 | Ciccarelli et al. ............. | 455/324 |
| 2004/0002323 A1* | 1/2004 | Zheng .......................... | 455/324 |
| 2004/0193965 A1* | 9/2004 | Coersmeier .................... | 714/48 |

FOREIGN PATENT DOCUMENTS

EP    0 111 803 B1    3/1989
(Continued)

OTHER PUBLICATIONS

"Digital I/Q Imbalance Compensation in a Low-IF Receiver", J.P.F. Glas, IEEE, 1998, pp. 1461-1466.
(Continued)

*Primary Examiner* — David C. Payne
*Assistant Examiner* — Tanmay Shah
(74) *Attorney, Agent, or Firm* — E. Russell Tarleton; Seed IP Law Group PLLC (57) ABSTRACT

Apparatus and methods for estimation and compensation of phase imbalance and gain imbalance are provided. A receiver for estimation or compensation of phase imbalance or gain imbalance utilizing a QPSK modulation and a modulation scheme based on a complex scrambling code includes means for estimating the phase imbalance or gain imbalance prior to symbol synchronization. Thus, the phase imbalance and gain imbalance will not introduce losses in subsequent phases of signal processing.

8 Claims, 8 Drawing Sheets

FOREIGN PATENT DOCUMENTS

| WO | 01/20800 A1 | 3/2001 |
|----|-------------|--------|
| WO | WO0150616   | 7/2001 |
| WO | 02/23667 A2 | 3/2002 |

OTHER PUBLICATIONS

"Improving QPSK Demodulator Performance for Quadrature Receiver with Information from Amplitude and Phase Imbalance Correction", H. Nguyen, IEEE, 2000, pp. 1440-1444.

"Blind Source Separation Based I/Q Imbalance Compensation" M. Valkama et al, IEEE, 2000, pp. 310-314.

"Advanced Methods for I/Q Imbalance Compensation in Communication Receivers", M. Valkama et al, IEEE, vol. 49, No. 10, Oct. 2001, pp. 2335-2344.

C. Hyun Lee et al., "A Self-Calibration Algorithm for an Asynchronous CDMA-based Antenna Array," 5 pages.

* cited by examiner

PHASE/GAIN IMBALANCE ESTIMATION OR COMPENSATION

BACKGROUND

1. Technical Field

The present invention relates to a receiver for estimation or compensation of phase imbalance or gain imbalance and methods which can be applied in a receiver for estimation or compensation of phase imbalance or gain imbalance. A transmission technique used in the receiver is based on a QPSK (quadrature phase shift keying) modulation and a modulation scheme based on complex scrambling code.

2. Description of the Related Art

The Universal Mobile Telecommunications System or UMTS is one of the major new 'third generation' (3G) mobile communications systems being developed within the framework defined by the ITU (International Telecommunication Union) and known as IMT-2000.

Methods for estimation or compensation of phase imbalance or gain imbalance typically rely on reference signal generation, adaptive interference cancellation, blind source separation or a least square approach in the Fourier domain. Such methods are known, e.g., from "Digital I/Q imbalance compensation in a low-if receiver", Jack P. Glas (Bell Labs)-1998-IEEE, "Improving QPSK Demodulator Performance for Quadrature Receiver with Information from Amplitude and Phase Imbalance Correction", Hung Ngyen (The Aerospace Corp.)-2000-IEEE, "Blind Source Separation Based I/Q imbalance compensation", Valkama, Renfors, Koivunen-2000-IEEE, "Advanced methods for I/Q imbalance compensation in Communication Receivers", M. Valkama, M. Renfros, V. Koivunen-IEEE transactions on signal processing-Vol. 49, no. 10, October 2001.

WO 0150616 discloses a receiver for correcting the phase error in a received signal. However, this receiver does not provide an efficient estimation or compensation of phase imbalance or gain imbalance in the received signal.

BRIEF SUMMARY

It is an object of the present invention to provide an efficient estimation or compensation of the phase imbalance or the gain imbalance.

According to an exemplary embodiment of the present invention, this object is solved with a receiver for estimation or compensation of phase imbalance or gain imbalance utilizing a QPSK modulation scheme and a modulation scheme based on complex scrambling code, the demodulator comprising means for estimating the phase imbalance or gain imbalance before synchronization.

Such a receiver according to an exemplary embodiment of the present invention, allows the estimation or compensation of phase imbalance or gain imbalance that can affect the overall performance of the receiver, at an early stage, i.e., before synchronization, by e.g., exploiting the properties of the complex scrambling code. Thus, phase imbalances or amplitude imbalances will not be able to introduce losses in the further phases of the connection. Furthermore, if the bandwidth inside which time variations in the imbalances occur is lower than the transmission bandwidth, the demodulator is also able to track these time variations.

The phase/gain imbalance estimation and compensation according to the present invention is e.g., tailored to the UMTS modulation scheme, i.e., may exploit the special properties of the UMTS modulation scheme for estimation and compensation of imperfections like phase-gain imbalances in the RF receiver or demodulator in an early stage of the receiver.

According to another exemplary embodiment of the present invention, I and Q components of the received signal affected by phase imbalance or gain imbalance after demodulation are determined. A ratio between a cross correlation of the I and Q components ($<IQ>$) and the mean value of the square of the I component ($<I^2>$) or a ratio between a cross correlation of the I and Q components and a square root of the product between the mean value of the square of the I component and the mean value of the square of the Q component ($(<I^2><Q^2>)^{1/2}$) or a ratio between the mean value of the square of the Q component, ($<Q^2>$) and the mean value of the square of the I ($<I^2>$) component are determined.

According to yet another exemplary embodiment of the present invention, a low pass for low pass filtering the signals are being implemented. By doing so, errors in the estimation of phase imbalance or gain imbalance can very efficiently be reduced, while computing mean values.

According to yet another exemplary embodiment of the present invention, the receiver comprises means for compensating the phase imbalance or gain imbalance before synchronization.

According to another exemplary embodiment, the receiver is a WCDMA (UMTS) receiver (Wide Band Code Division Multiple Access receiver). Thus, as a basic principle exploited in the WCDMA (UMTS) receiver, the channel is frequency selective with respect to the transmission bandwidth allowing for a very accurate estimation of the phase/gain imbalance before synchronization.

According to another exemplary embodiment, the estimation of the phase imbalance or gain imbalance is carried out iteratively providing for very accurate results.

According to yet another exemplary embodiment, a method for estimation or compensation of phase imbalance or gain imbalance in a receiver is provided, which may advantageously exploit the properties of the complex scrambling code and of the overall UMTS modulation scheme in the early stage of the receiver by estimating the phase imbalance or gain imbalance before synchronization.

According to an exemplary embodiment of the present invention, a very simple method is provided, requiring only minimized computation power, and which may advantageously allow an iterative solution for estimating compensating both phase and gain.

According to yet another exemplary embodiment of the present invention, a feed-forward scheme or a feed-back scheme is established.

According to another exemplary embodiment, the estimation of the phase imbalance or gain imbalance is carried out iteratively providing for a very efficient compensation/estimation.

According to the present invention, there is also provided a computer program for estimation or compensation of phase imbalance or gain imbalance.

It may be seen as a gist of the present invention that the phase imbalance or gain imbalance is estimated or compensated before symbol synchronization. Thus the phase imbalance and gain imbalance will not be able to introduce losses in the further phases of the connection; also the method is able to track temporal drifts in phase and in gain if the bandwidth inside which these phenomena occur is lower than the transmission bandwidth. The advantage of this method is that it can be used both for phase imbalance estimation and compensation and gain imbalance estimation and compensation in the case that there is also a gain mismatch.

BRIEF DESCRIPTION OF THE SEVERAL VIEWS OF THE DRAWINGS

These and other aspects of the present invention will be apparent from and elucidated with reference to the embodiments described hereinafter. These embodiments will be described with reference to the following Figures.

DETAILED DESCRIPTION

In the following description of the above Figures, the same reference numbers are used for the same or corresponding elements.

Figure 1:
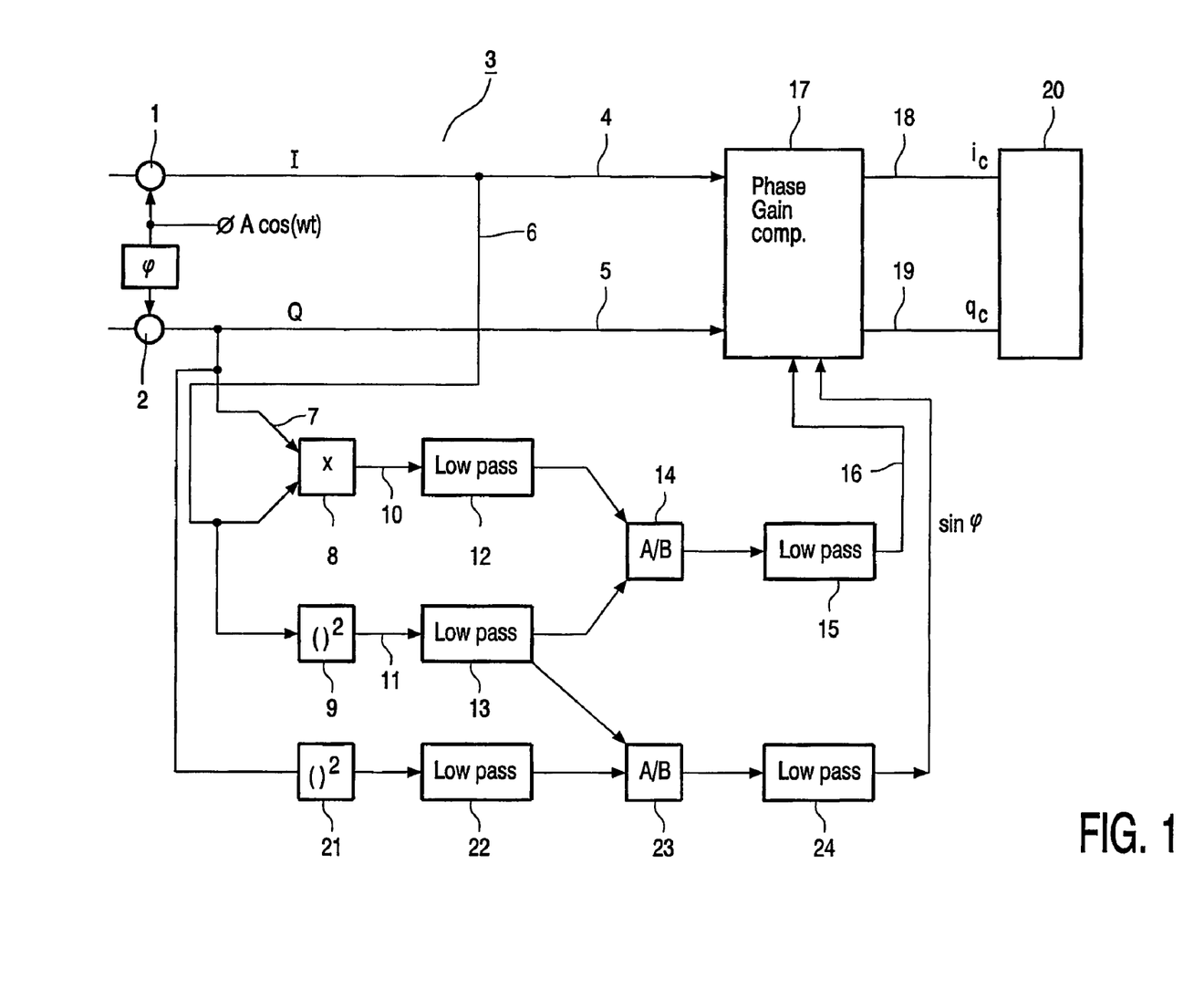
FIG. 1 shows a feed-forward scheme for phase imbalance estimation and compensation according to an aspect of the present invention.

FIG. 1 shows a device with a feed-forward scheme for phase imbalance estimation and compensation according to an aspect of the present invention. As will be shown below, the demodulation method according to which the device of FIG. 1 is operating relies on the fact that the correlation matrix of the transmitted components, (i,q) is diagonal. As a consequence, if I and Q are the in-phase and quadrature components of the received signal (with $I = k \cdot i$ and $Q = k \cdot (-i \cdot \sin \phi + q \cdot \cos \phi)$ as shown in equations (1)), the correlation between I and Q, even after propagation through the fading multipath scenario, comprises only a term due to phase imbalance. This is due to the property of the QPSK modulation scheme and the complex scrambling code. This is shown in more detail in the following with respect to a UMTS system:

The waveform transmitted in accordance with UMTS The UMTS transmission scheme in the downlink is based on a:

QPSK modulation
Complex scrambling code

The QPSK modulation scheme basically maps each two chips to be transmitted to a symbol of a quaternary constellation. QPSK symbols can be tough as complex numbers, and the application of the complex scrambling code to the QPSK symbols represented in terms of multiplication between complex numbers. In other words, to scramble the symbol (at the instant n) $s(n)=(s1(n),s2(n))$, the symbol for the scrambling code element $c(n)=(c1(n),c2(n))$ has to be multiplied in accordance with the following rule:

$$s \cdot c = (s1(n) \cdot c1(n) - s2(n) \cdot c2(n), s1(n) \cdot c2(n) + s2(n) \cdot c1(n)) \quad (1)$$

The two sequences composing the complex scrambling code, i.e., the s1(n) and s2(n) are selected in a family of Gold codes and have the following properties in first approximation:

$$s1(n)^* s1(n+m) = 0, m \neq 0$$

$$s1(n)^* s2(n+m) = 0, \forall m \quad (2)$$

where * refers to the correlation operation.

It is important to note that above equations (2) hold true in first approximation, and that the correlation interval can be extended to the full length of the code, but also to sub-intervals.

Indeed, if the components i and q of the transmitted signal given from the equation (1) are considered, the following equations (3) can be derived:

$$i(n) = s1(n) \cdot c1(n) - s2(n) \cdot c2(n)$$

$$q(n) = s1(n) \cdot c2(n) + s2(n) \cdot c1(n)$$

$$i(n)^* q(n) = \langle i(n) \cdot q(n+m) \rangle = 0 \quad (3)$$

These relationships hold true for the maximal length of the Gold sequences, but also for intervals included if the included intervals are selected to have sufficient length. In the case of the UMTS, for the bandwidth involved, it is common understanding that the sufficient length can be extended to about 256 chips, i.e., the duration of a pilot symbol.

The In-Phase and the Quadrature Components of the Received Signal are Uncorrelated In the following, it is shown that after propagation through a multi-path fading environment, if there is no phase imbalance, the in-phase and the quadrature components of the received signal are still uncorrelated.

At this point, i.e., before decoding, the signal is a mixture of voice, date and control information. The signal at the receiver can be written:

$$r(t) = \Sigma_i g_i e^{j\phi_i} \cdot s(t-\tau_i) = \Sigma r_i(t)$$

where the channel attenuation, delay and phase rotation is considered for each path. In what follows, I and Q are the in-phase and quadrature component of the received signal. $I_i$ and $Q_i$ are the received components on the i-path, and $i_i(t-\tau_i)$ and $q_i(t-\tau_i)$ represent the i-esima replica of the in-phase and quadrature components of the transmitted signals i(t) and q(t), due to the path i. $\tau_i$ is the delay of the transmission path.

The I and Q components of $r_i(t)$ can be expressed:

$$I_i = g_i [i_i(t-\tau_i) \cdot \cos(\phi_i) + q_i(t-\tau_i) \cdot \sin(\phi_i)]$$

$$Q_i = g_i [i_i(t-\tau_i) \cdot (-\sin(\phi_i)) + q_i(t-\tau_i) \cdot \cos(\phi_i)]$$

from which it follows for the elements of the auto correlation matrix:

$$\langle I_i^2 \rangle = \langle g_i^2 \rangle \cdot \langle i_i^2 \rangle \cdot \langle \cos(\phi_i)^2 \rangle + \langle g_i^2 \rangle \cdot \langle q_i^2 \rangle \cdot \langle \sin(\phi_i)^2 \rangle - 2 \langle g_i^2 \rangle \cdot \langle i_i q_i \rangle \cdot \langle \sin(\phi_i) \cos(\phi_i) \rangle$$

$$\langle Q_i^2 \rangle = \langle g_i^2 \rangle \cdot \langle i_i^2 \rangle \cdot \langle \sin(\phi_i)^2 \rangle + \langle g_i^2 \rangle \cdot \langle q_i^2 \rangle \cdot \langle \cos(\phi_i)^2 \rangle - 2 \langle g_i^2 \rangle \cdot \langle i_i q_i \rangle \cdot \langle \sin(\phi_i) \cos(\phi_i) \rangle$$

$$\langle I_i Q_i \rangle = \langle g_i^2 \rangle \cdot \langle i_i^2 \rangle \cdot \langle -\sin(\phi_i) \cos(\phi_i) \rangle + \langle g_i^2 \rangle \cdot \langle q_i^2 \rangle \cdot \langle \sin(\phi_i) \cos(\phi_i) \rangle - \langle g_i^2 \rangle \cdot \langle i_i q_i \rangle \cdot \langle \sin(\phi_i)^2 \rangle - \langle g_i^2 \rangle \cdot \langle i_i q_i \rangle \cdot \langle \cos(\phi_i)^2 \rangle$$

It has to be noted that $\langle i_i^2 \rangle = \langle q_i^2 \rangle = P/2$ holds true for each I, with P being the transmitted power for each symbol.

Also, $\langle i_i \cdot q_i \rangle = 0$ holds true for the orthogonal property of the in-phase and quadrature components of the transmitted signal.

Also, the terms $g_i$, representing the channel attenuation for each path i, depend on the time. However, their dependence is slow with respect to the period onto which the mean operations are extended, and it can be assumed that they are uncorrelated with the temporal variations in the transmitted signal. As a consequence, the channel terms in the mean operations can be separated and written as follows:

$$\langle g_i^2 \rangle = g_i^2(t)$$

The same separation is performed for $\sin(\phi_i)$ and $\cos(\phi_i)$ giving the phase information for each path.

It follows that $$\langle I_i^2 \rangle = \langle Q_i^2 \rangle = g_i^2(t) * P/2$$

i.e., the received power is determined by the transmitted power and the channel gain.

Furthermore, it follows that $$\langle I_i \cdot Q_i \rangle = 0$$

i.e., the signal received on one path has in-phase and quadrature components that are orthogonal.

Assuming a normalized power (per bit) during transmission (i.e., P/2=1), a consideration of the correlation between in-phase and quadrature components on the same path yields the following matrix:

$$\begin{pmatrix} \langle I_r^2 \rangle & \langle I_r \cdot Q_r \rangle \\ \langle Q_r \cdot I_r \rangle & \langle Q_r^2 \rangle \end{pmatrix} = \begin{pmatrix} g^2(t) & 0 \\ 0 & g^2(t) \end{pmatrix}$$

where:

$$g^2(t) = \Sigma_i g_i^2(t)$$

The Correlation Between the Terms Due to Different Paths

In the following, the correlations between the terms due to different paths are considered.

The cross correlation between elements of different paths can be written as follows:

$$\langle I_i \cdot I_j \rangle = \langle g_i \cdot g_j \rangle \cdot \langle i_i \cdot i_j \rangle \cdot \cos(\phi_i)\cos(\phi_j) \rangle + \langle g_i g_j \rangle \cdot \\ (q_i q_j) \cdot \langle \sin(\phi_i)\sin(\phi_j) \rangle - \langle g_i g_j \rangle \cdot \langle i_i q_j \rangle \langle \sin(\phi_j)\cos(\phi_i) \rangle + \langle g_i g_j \rangle \cdot \langle q_i i_j \rangle \langle \cos(\phi_i)\sin(\phi_j) \rangle$$

$$\langle I_i \cdot Q_j \rangle = \langle g_i g_j \rangle \cdot \langle i_i i_j \rangle \cdot \langle -\sin(\phi_i)\cos(\phi_j) \rangle + \langle g_i g_j \rangle \cdot \\ \langle q_i q_j \rangle \langle \sin(\phi_i)\cos(\phi_j) \rangle - \langle g_i g_j \rangle \cdot \langle i_i q_j \rangle \langle \sin(\phi_i) \\ \sin(\phi_j) \rangle + \langle g_i g_j \rangle \cdot \langle q_i i_j \rangle \langle \cos(\phi_i) \cdot \cos(\phi_j) \rangle$$

where, in the temporal mean, the terms due to the channel, $g_i$ and $\phi_i$, and the statistical operations involving these terms have been separated. Similar expressions can be derived for $\langle Q_i \cdot Q_j \rangle$ and $\langle Q_j \cdot I_i \rangle$.

Since:

$$\langle i_i \cdot i_j \rangle = \langle q_i \cdot q_j \rangle = \langle q_i \cdot i_j \rangle = 0$$

for i≠j, all these terms are zero both in the short term and in the long term.

Therefore it can be concluded that the correlation matrix between the components I and Q at the receiver is diagonal. Furthermore, elements on the principal diagonal depend on the time varying channel. However, it can be derived from equation (7) stated below, and from the fact that the channel is varying slowly with respect to the temporal extensions on which the temporal means for computing the correlations are taken, that this dependency does not influence the estimation of the gain/phase imbalance, since it is present at both the numerator and at the denominator of the final expression for $\sin(\phi)$.

As shown in FIG. 1, in a feed-forward scheme for phase imbalance estimation and compensation according to an aspect of the present invention, an incoming complex signal r(t) is received at a receiver station not shown in FIG. 1 and is further processed such that the complex signal r(t) is provided to input connections 1 and 2 of the receiver or demodulator 3. After that, the complex signal r(t) is demodulated. Between the input connections 1 and 2, the signal $A \cdot \cos(\omega t)$ represents the waveform used in the receiver to demodulate the incoming signal. Signal I on line 4 and signal Q on line 5 are called the I and Q components of the demodulated complex signal r(t) in the following. The I signal or component is the "in-phase" component of the signal r(t) and the Q signal or component is the quadrature component.

The I and Q components affected by phase imbalance or gain imbalance and are provided to lines 6 and 7, which are connected to lines 4 and 5. The I and Q components are fed into means 8 for taking the cross correlation of I and Q, such as a multiplier. Additionally, the I component is fed into means 9 for taking the quadrature of I, such as a multiplier which multiplies I with I. After that, the resulting signals are taken through low pass filters 12, 13 by lines 10, 11, respectively. For estimation of the phase imbalance, a ratio between the cross correlation of I and Q and the mean value of the square of I is generated by means for generating a ratio 14, such as a divider, and consecutively passed through low pass filter 15. After that, the resulting signal is provided to a phase/gain compensator 17 via a line 16. The phase/gain compensator 17 compensates the phase imbalance or the gain imbalance of the I and Q components. Thereupon, the estimated and compensated I and Q components $i_c$ and $q_c$, are taken by lines 18 and 19, respectively, to be fed into means for synchronization 20, such as a UMTS synchronizer. After synchronization, the signal is ready for further processing, e.g., in reference to the standard architecture for the UMTS receiver, it can be fed into the rake receiver to exploit time diversity and then to the channel decoder to correct/reveal residual errors.

Reference character 21 designates a multiplier or squaring device connected to line 5. An output of the multiplier 21 is connected to a low pass 22. An output of the low pass 22 is connected to another divider 23. The divider 23 receives the output signals from the low pass 13 and the low pass 22 and outputs a ratio of the two input signals. The output of the divider 23 is connected to another low pass 24, which in turn is connected to the phase/gain compensator 17.

The operating principle of the receiver of FIG. 1 and a method for operating the receiver of FIG. 1 according to an exemplary embodiment of the present invention will be described in the following.

Phase Imbalance Estimation

The method for phase imbalance estimation according to an exemplary embodiment is based on the observation that after the demodulator, the I and Q components affected by imbalance can be written as function of the i and q components without imbalance as shown in equation (4):

$$I = k \cdot i$$

$$Q = k \cdot (-i \cdot \sin\phi + q \cdot \cos\phi) \quad (4)$$

Equations (4) hold true if the phase of the I-branch of the demodulator is aligned with the phase of the i component of the received signal.

(i,q) is assumed to be the transmitted signal for UMTS, i.e., the signal without including the effects due to the propagation through the multi-path fading channel. From the complex scrambling code properties and from the modulation scheme adopted the following equations (5) can be inferred.

$$\langle i \cdot q \rangle = \langle q \cdot i \rangle = 0$$

$$\langle i \cdot i \rangle = \langle q \cdot q \rangle = P/2 \quad (5)$$

Thus the correlation matrix of (i,q) is diagonal as already described above and the terms on the principal diagonal depend from the transmission power.

From (4) and (5) it can be written:

$$\langle I \cdot Q \rangle = -k \cdot \langle i^2 \rangle \sin \phi$$

$$\langle I^2 \rangle = k \cdot \langle i^2 \rangle \quad (6)$$

$\langle I \cdot Q \rangle$ is the output signal of the low pass 12 and $\langle I^2 \rangle$ is the output signal of the low pass 13. Both signals are input to the means for generating a ratio 14.

As shown above, it can be inferred that:

$$\sin \phi = -\langle I \cdot Q \rangle / \langle I^2 \rangle \quad (7)$$

where $\langle I \cdot Q \rangle$ is defined as cross correlation of I and Q, $\langle I^2 \rangle$ as quadrature of I, and $\langle Q^2 \rangle$ as quadrature or square of Q.

When propagating through the multi-fading environment, the ideal QPSK (quadrature phase shift keying) constellation at the transmitter is rotated/attenuated/delayed for each path. This has an influence on the cross correlation properties of (i,q) before the receiver. Furthermore, the signal becomes intrinsically not stationary and the statistics of the (i,q) samples get more complicated by the fact that there can be correlations between delayed versions of the same signal. It has been shown above that these effects have no influence and the residual presence in the cross correlation in the received components $(i_r, q_r)$ is only due to the phase imbalance.

For compensation of the phase imbalance, the resulting signal is put into phase/gain compensator 17, which applies the following equations:

$$i_c = I$$

$$q_c = (Q + I \cdot \sin \phi)/\cos \phi \quad (8)$$

where:

$$\cos \phi = ((\langle I^2 \rangle^2 - \langle I \cdot Q \rangle^2)/\langle I^2 \rangle^2)^{1/2} \quad (9)$$

$i_c$ and $q_c$ are the output signals of the phase/gain compensator 17 on the lines 18 and 19.

Gain Imbalance Estimation in the Presence of Phase Imbalance

In the following, the method is extended to the case in which there is also an amplitude mismatch besides the phase imbalance.

In case there is also an amplitude mismatch, the above equations can be written as follows:

$$I = g(t)(k_1 \cdot i)$$

$$Q = g(t)(k_2 \cdot (-i \cdot \sin \phi + q \cdot \cos \phi))$$

$$\langle I, Q \rangle = k_1 \cdot k_2 \cdot \langle g(t)^2 \rangle \cdot \langle q^2 \rangle \sin(\phi)$$

$$\langle I Q \rangle = -k_1 \cdot k_2 \langle g(t)^2 \rangle \langle i^2 \rangle \sin(\phi) - k_1 \cdot k_2 \langle g(t)^2 \rangle \langle q^2 \rangle \sin(\phi)$$

$$\langle Q \cdot Q \rangle = k_2^2 \cdot \langle g(t)^2 \rangle (\langle i^2 \rangle \cos(\phi)^2 + \langle q^2 \rangle \sin(\phi)^2) = k_2 \cdot \langle q^2 \rangle$$

$$\langle I \cdot I \rangle = k_1^2 \langle g(t)^2 \rangle \langle i^2 \rangle$$

From these equations it follows:

$$\langle I, Q \rangle / (\langle I^2 \rangle \langle Q^2 \rangle)^{1/2} = -\sin(\phi)$$

$$\langle Q^2 \rangle / \langle I^2 \rangle = k_2^2 / k_1^2 \quad (10)$$

Where the ratio $\langle Q^2 \rangle / \langle I^2 \rangle$ is the output signal of the divider 23. After a low pass filtering by means of low pass 23, the ratio $\langle Q^2 \rangle / \langle I^2 \rangle$ is provided to the phase/gain compensator 17.

Note that the temporal coefficient g(t) representing the amplitude of the channel dependence on time can be simplified, because it appears both in the numerator and in the denominator of equation (10), which can be considered a generalization of equation (7). The phase factors are removed also, because they would anyway disappear in the auto-correlation matrix.

Feed-Back Scheme for Phase Imbalance

Figure 2:
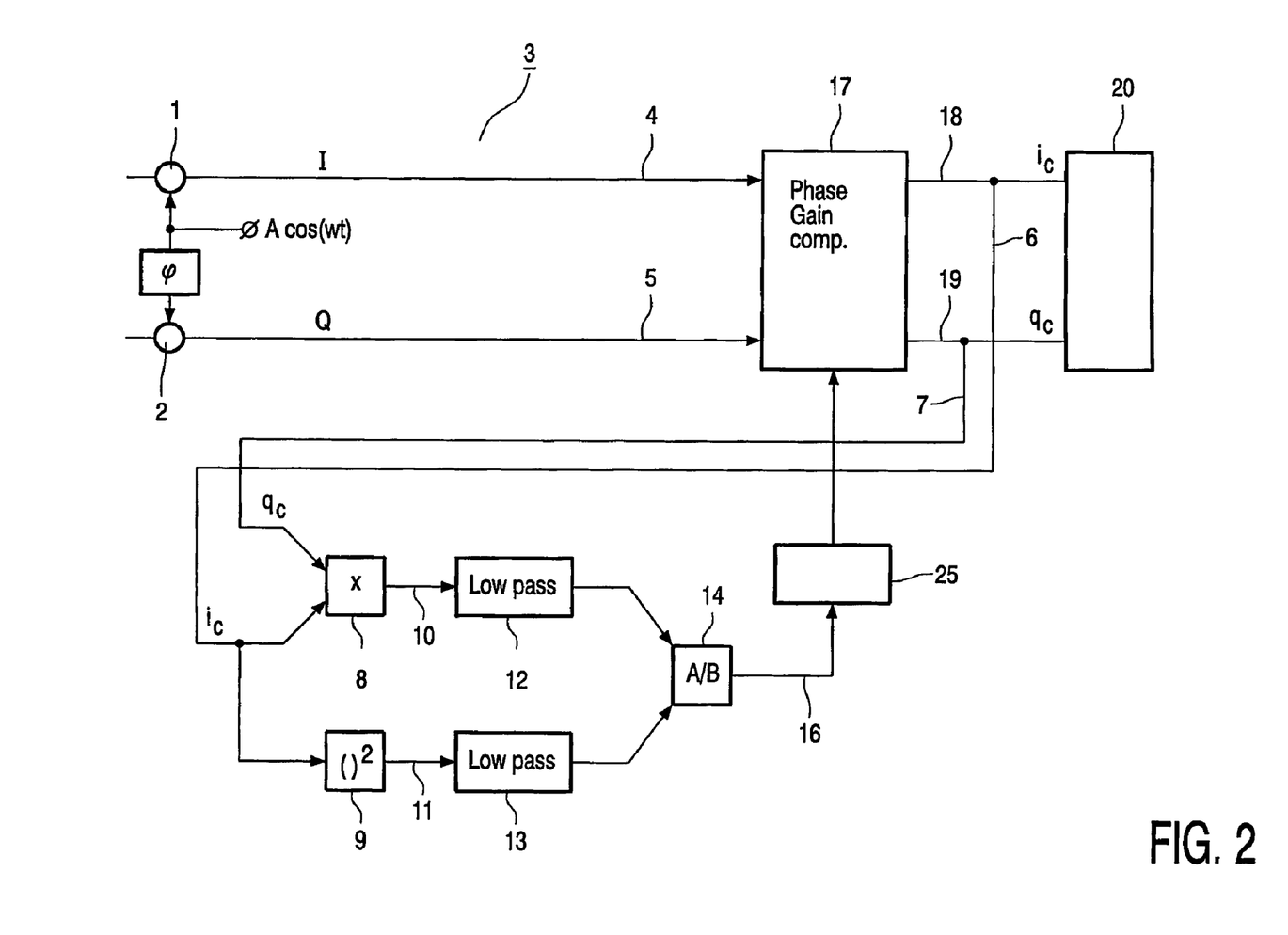
FIG. 2 shows a feed-back scheme for phase imbalance estimation and/or compensation according to an aspect of the present invention.

FIG. 2 shows a feed-back phase imbalance estimation and compensation device according to an aspect of the present invention. As shown in FIG. 2, an incoming complex signal r(t) is received at a receiver station not shown in FIG. 2 and is further processed such that the complex signal r(t) is provided to input connections 1 and 2 of the demodulator 3. After that, the complex signal r(t) is demodulated. Between the input connections 1 and 2, A·cos(ωt) represents the waveform used in the receiver to demodulate the incoming signal.

The I component on line 4 and the Q component on line 5 of the demodulated complex signal r(t), which are affected by phase imbalance or gain imbalance, are put through phase/gain compensator 17 and afterwards provided to lines 18 and 19. The output signals of the phase/gain compensator 17 are designated with $i_c$ and $q_c$. The $i_c$ and $q_c$ signals are fed into means 8 for taking the cross correlation of the I and Q components, such as a multiplier by means of lines 6 and 7. Additionally, the $i_c$ signal is fed into means 9 for taking the quadrature or square of the I component, such as a multiplier which multiplies the $i_c$ with itself. After that, the resulting signals are provided to low pass filters 12, 13 via lines 10, 11, respectively.

For estimation of the phase imbalance, a ratio between the cross correlation of I and Q and the quadrature of I is generated by means for generating a ratio 14, such as a divider. After that, the resulting signal is integrated by means of an integrator 25 provided to line 16 and fed back into the phase/gain compensator 17 located between lines 4, 5 and 18, 19, for compensating/estimating the phase imbalance or the gain imbalance of the I and Q components. Thereupon, the estimated and compensated I and Q components $i_c$ and $q_c$, respectively, are fed back to lines 18, 19 to be fed into means for synchronization 20 such as a UMTS synchronizer.

In the following, an exemplary embodiment of a method of the present invention for operating the device of FIG. 2 and its operating principle will be described.

In the feed-back phase imbalance estimation and compensation device according to the present invention and the method for operating the feed-back phase imbalance estimation and compensation device according to the present invention, the compensated output of the phase/gain compensator 17 feeds the imbalance estimation. Some simplifications have been introduced in the formulas for the compensation and for the phase estimation. This is possible because in the next iteration in the loop the phase error gets smaller and the approximation of the sinus with the value of the angle and the cosines with 1 is appropriate. The principle of the method will be described and explained in the following:

The following equation can be used for the estimation of the phase φ:

$$\varphi = -\langle I \cdot Q \rangle / \langle I^2 \rangle \quad (11)$$

The phase compensation carried out in the phase/gain compensator 17 can be described with the following equation:

$$i_c = I \quad (12)$$

$$q_c = (Q + I \cdot \varphi) \quad (13)$$

A further simplification which can be introduced for the phase compensation feedback method is to use the following expression for the phase:

$$\varphi = -k^* \langle I \cdot Q \rangle \text{ (un-normalized expression for the error)}$$

where k is a constant. This is possible because this term is equal to zero when the phase imbalance is zero. Hence, this the signal represented by this term can be then used as error in the feedback scheme.

According to an aspect of the present invention, a more efficient way to implement the feedback scheme is via an iterative procedure. According to this aspect, the low pass filters and the integral may unified in a single computation step for implementation. This will be described with more detail in the following:

Iterative Implementation for Phase Imbalance

In the following, $i_c(n)$, $q_c(n)$ are the phase compensated received in-phase components and quadrature components.

1) At an instant n, the following error function is computed:

$$e = i_c(n) \cdot q_c(n)$$

2) Then, the following equation is used to obtain a filtered integrated expression for the error:

$$e_f = e + \rho \cdot e$$

where the parameter ρ is chosen by matching convergence speed and stability.

3) Then, the next (subsequent) $i_c(n+1)$, $q_c(n+1)$ is computed from the next $i(n+1)$, $q(n+1)$ received samples as follows:

$$i_c(n+1), i(n+1)$$

$$q_c(n+1) = q(n+1) + i(n+1) \cdot e_f$$

Then, the method returns iteratively to step 1). It has to be noted that the final value for $e_f$ represent the estimated sinus of the phase imbalance multiplied for the gain factor k.

Feedback Scheme for Gain Imbalance

Figure 3:
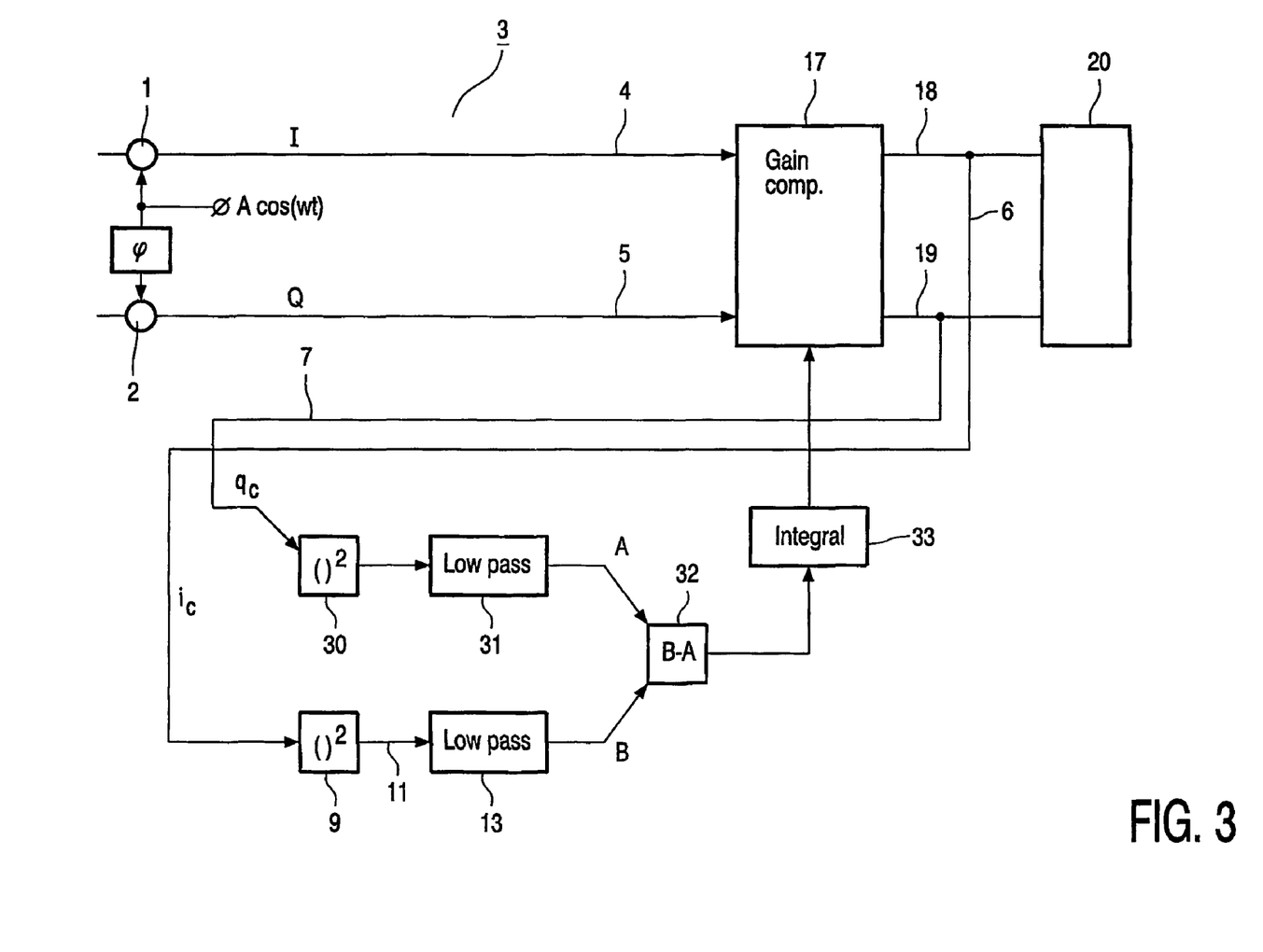
FIG. 3 shows a feed-back scheme for gain compensation according to an aspect of the present invention.

FIG. 3 shows a device for gain compensation with a feedback scheme.

The signal $i_c$ on the line 18 is provided to means 30 for taking the quadrature or square via line 7. The output signal of the means 30 for taking the quadrature is filtered by means of a low pass 31 and then provided to means for subtracting 32 such as a subtractor. This signal is designated as signal A in FIG. 3.

The signal $q_c$ on the line 19 is provided to means 9 for taking the quadrature or square via line 6. The output signal of the means 13 for taking the quadrature is filtered by means of a low pass 31 and then provided to the means for subtracting 32. This signal is designated as signal B in FIG. 3. The means for subtracting 32 are configured such that the output signal of the low pass 31 is subtracted from the output signal of the low pass which is indicated by B−A in FIG. 3.

The device depicted in FIG. 3 operates as follows: The received input is demodulated, and then gain compensated in the each iteration of the loop. The gain compensated components are squared, filtered and subtracted to build an error function which is integrated and then provided to the gain compensation block 17, to be processed together with the incoming signal.

The equations that give a rationale of the method are the followings.

Starting from the equations:

$$\frac{\langle I \cdot Q \rangle}{\sqrt{\langle I^2 \rangle \langle Q^2 \rangle}} = \sin(\varphi)$$

$$\frac{\langle Q^2 \rangle}{\langle I^2 \rangle} = \frac{k_2^2}{k_1^2}$$

wherein x can be defined as follows:

$$x = \frac{k_1^2 - k_2^2}{k_1^2} = \frac{\langle I^2 \rangle - \langle Q^2 \rangle}{\langle I^2 \rangle} \cong \frac{2 \cdot k_1 \cdot (k_1 - k_2)}{k_1^2} = \frac{2 \cdot (k_1 - k_2)}{k_1} \quad (14)$$

which becomes:

$$x = \frac{k_1^2 - k_2^2}{k_1^2} = \frac{\langle I^2 \rangle - \langle Q^2 \rangle}{\langle I^2 \rangle} \cong \frac{2 \cdot k_1 \cdot (k_1 - k_2)}{k_1^2} = \frac{2 \cdot (k_1 - k_2)}{k_1} \quad (15)$$

and $$g_c = 1 - 0.5 \cdot x = \frac{k_1}{k_2} \quad (16)$$

where the following approximation has been used:

$$x = k_1 + k_2 \cong 2 \cdot k_1$$

The gain compensated components are obtained as follows:

$$i_c = I$$

$$q_c = Q \cdot g \quad (17)$$

Note that the derivation is based on an approximation becoming more precise with a decreasing difference between $k_1$ and $k_2$ under the condition that it is realized in the next iterations of the loop.

A further simplification is obtained by considering:

$$x^1 = k_1^2 - k_2^2 \text{ (un-normalized expression for the error)}$$

for applying the method. In fact, this last expression is zero for gain balanced components, and does not involve the ratio operation which can present some problems in the presence of noise.

Iterative Implementation for Gain Imbalance Estimation and Compensation

An even more efficient way to perform the low pass filtering and the integration operation is represented by the following steps in accordance with an exemplary embodiment of the present invention:

1) In an instant n, the following term is computed:

$$e = i_c(n)^2 - q_c(n)^2$$

2) Then, the following equation is used to obtain a filtered integrated expression for the error:

$$e_f = e + \rho \cdot e$$

where the parameter ρ is chosen by matching convergence speed and stability

3) Then, the gain g cab be derived as follows (k is a given constant):

$$g = 1 - k \cdot e_f$$

4) The computed gain is then applied to the next i and q samples:

$$i_c(n+1) = (n+1)$$

$$q_c(n+1) = q(n+1) \cdot g$$

5) Then, the method iteratively restarts from step 1)

Note the final value of g will represent the estimated value for the gain. Advantageously, this iterative method is valid in presence of a phase imbalance and in absence of phase imbalance.

Phase and Gain Imbalance: Feedback/Iterative Method

The two loops represented in FIGS. 2 and 3 can be serially concatenated to obtain simultaneous compensation of phase and gain. In particular, the output of the loop represented in FIG. 2 can be the input of the loop represented in FIG. 3 and the final output would be compensated both in phase and in gain. This is a consequence of the fact that in the equations (10) phase and gain imbalances are independent. Also, if this independence does not apply in the case in which un-normalized expressions are used for the errors to reduce complexity, it can still be shown that the serial concatenation of the loops operates very efficiently. In fact, in this last case, the residual phase imbalance influence the estimation of the gain imbalance in the next iteration of the loops, but this influence becomes zero when the phase error becomes zero. Accordingly, the coupling created by using the un-normalized forms for the errors creates a reciprocal influence in terms of convergence speed, but does not affect the convergence itself.

Figure 11:
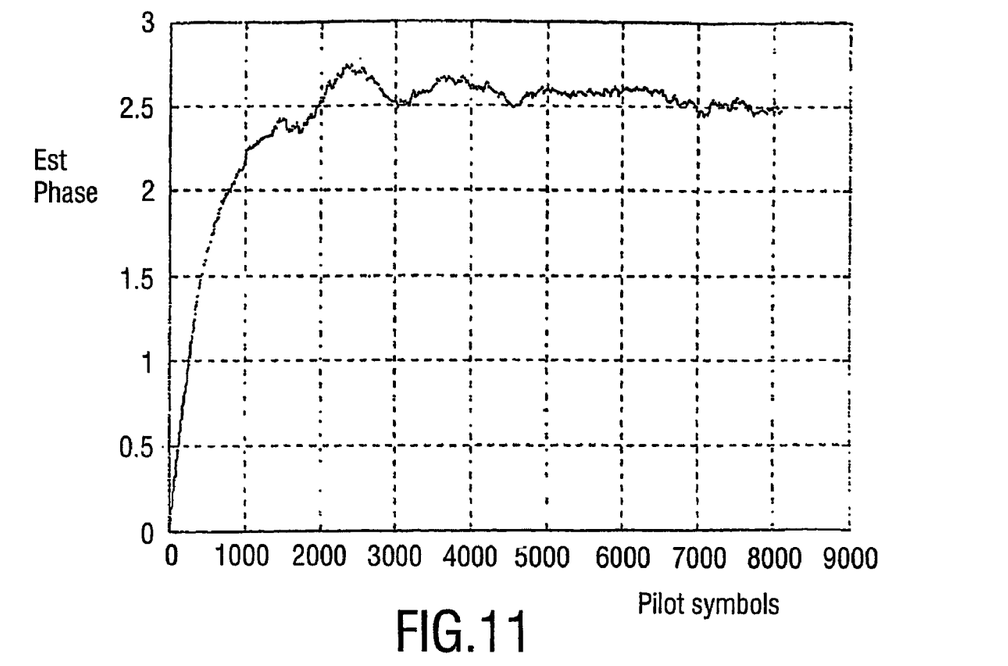
FIG. 11 shows an estimated phase in accordance with an iterative implementation of the method according to the present invention.
Figure 12:
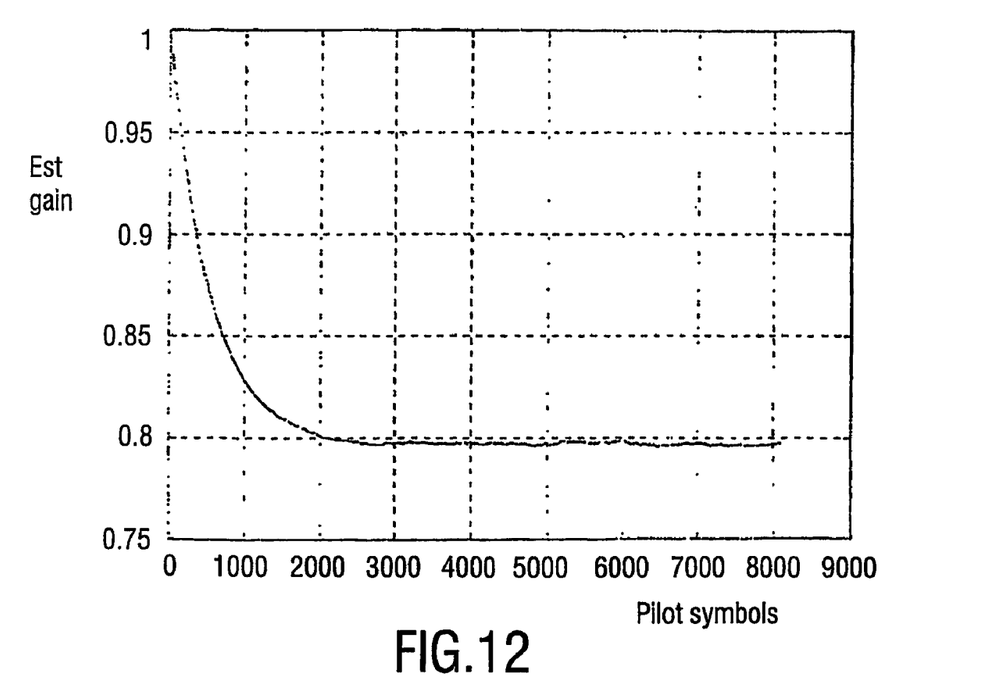
FIG. 12 shows a gain error in accordance with an iterative implementation of the method according to the present invention.

FIGS. 11 and 12 depict results achieved with two concatenated iterative loops in which the phase and the gain are simultaneously compensated.

As will be shown in the following, the above iterative approach based on un-normalized errors allows for a very efficient and more general estimation and/or compensation of gain/phase imbalances. In fact, starting from the following equations:

$$I = k_1 \cdot i \quad (18)$$

$$Q = -k_3 \cdot i \cdot \sin \phi + k_2 q \cdot \cos \phi$$

in which $k_3$ is used for the part of i injected on the q branch, it can be shown that:

$$\langle I \cdot Q \rangle = k_1 k_3 \sin(\phi) \langle i^2 \rangle$$

$$\langle I^2 \rangle - \langle Q^2 \rangle = \langle i^2 \rangle (k_1^2 - k_3^2 \operatorname{sen}^2 \phi) - k_2^2 q^2 \cos \phi \quad (19)$$

As can be seen from these equations (19), the first one holds true if one of the two phase and gain imbalanced components is multiplied with an arbitrary factor. Also, <IQ> gives an error that is zero only if the phase imbalance is zero. On the other hand, in absence of phase imbalance, the second equation is zero, if and only if:

$$\langle I^2 \rangle - \langle Q^2 \rangle = (\langle i^2 \rangle k_1^2 - \langle q^2 \rangle k_2^2) = 0; \quad (20)$$

$$\frac{\langle i^2 \rangle}{\langle q^2 \rangle} = \frac{k_1^2}{k_2^2}$$

In this way, a cascade scheme can be designed, in which the equation for the phase is applied on phase unbalanced components as given in equation (11). The output of this first loop feeds a second loop, which applies the procedure given in equations (12) and (13) to estimate and compensate for the gain imbalance. This scheme will compensate both phase and gain imbalance in a computational effective way whenever they can be expressed in the form given by the equations (18).

Figure 4:
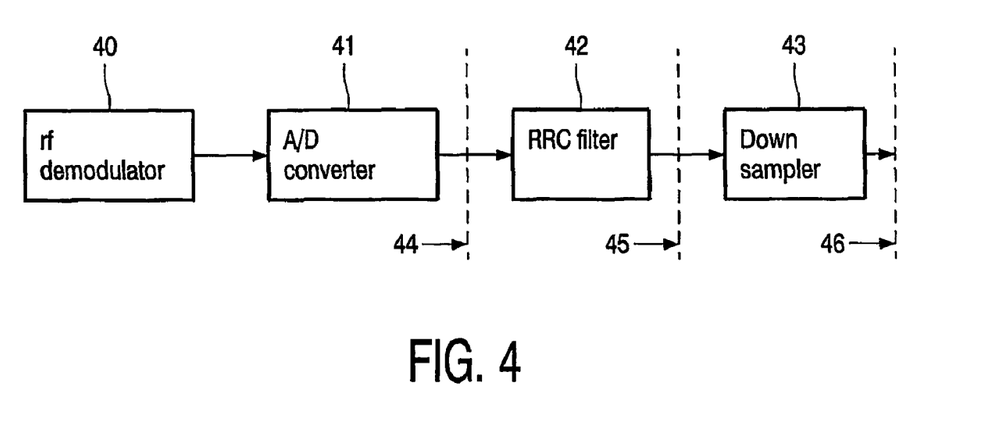
FIG. 4 shows schematically preferred application points for the method according to the present invention.

FIG. 4 shows components of a UMTS receiver. There is a radio frequency (rf) demodulator 40 which output signal is input to an A/D converter 41. The output of A/D converter 41 is input to an RRC filter 42 which is connected to a down sampler 43. From the down sampler 43, the signal is output to a further processing. The lines 44, 45 and 46 indicate positions within the UMTS receiver, where the above methods for phase and/or gain imbalance estimation and/or compensation may be applied. As can be seen from FIG. 4, phase and/or gain imbalance estimation and/or compensation may be applied between the A/D converter 41 and the RRC filter 42, i.e., before the RRC filter 42, between the RRC filter 42 and the down sampler 43, i.e., before the down sampler 43, and after the down sampler 43 before the further processing. Therefore, according to the present invention, a great degree of freedom is provided for the design of a receiver according to the present invention.

Performance of the Inventive Method and Device

Figure 5:
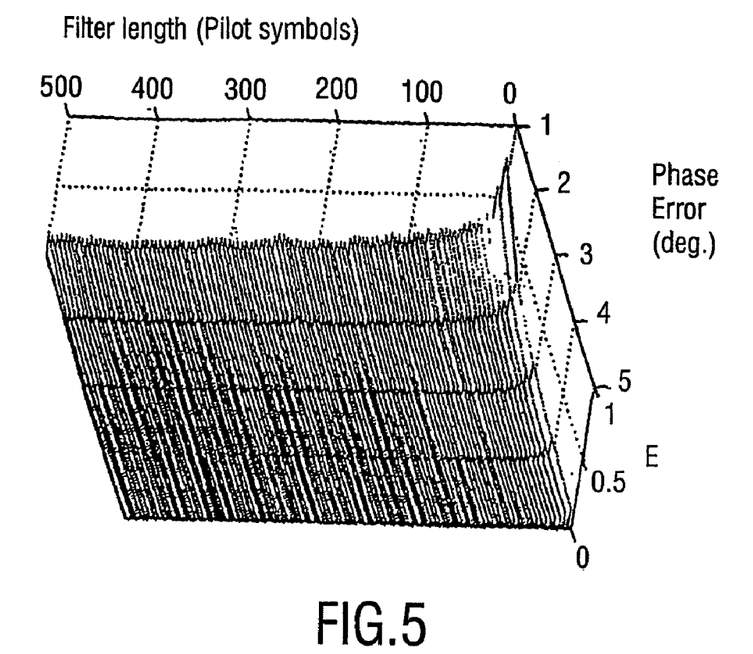
FIG. 5 shows simulation results for different filter lengths and a velocity of 3 km/h.
Figure 6:
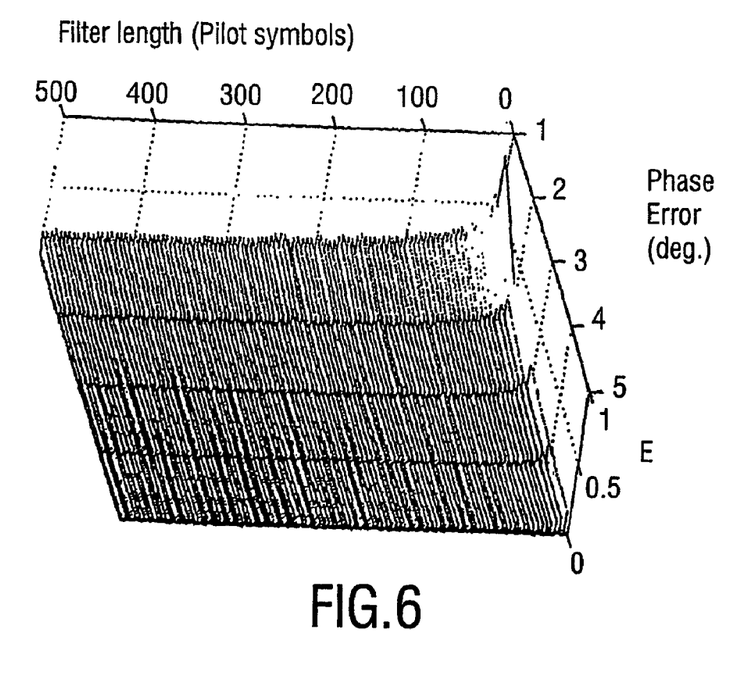
FIG. 6 shows simulation results for different filter lengths and a velocity of 120 km/h.
Figure 7:
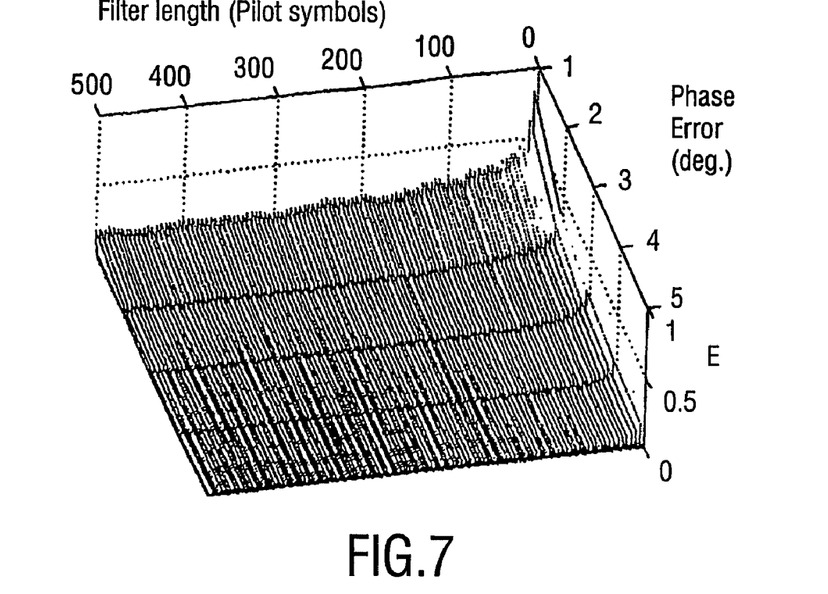
FIG. 7 shows simulation results for different filter lengths and a velocity of 250 km/h.

FIGS. 5-7 show a ratio between the estimation error and the true value for filters of different length as resulting from a simulation based on typical conditions for UMTS receivers extracted from the standard specifications. The phase imbalance error reaching from 0 to 5 degrees and the length of the low pass 2 in FIG. 1 are represented in the X, Y axes. The unit for the length of the low pass filter is 1 pilot symbol, i.e., 256 chips. The length of the low pass filter 1 in FIG. 1 is always assumed to be 256 chips. The Z-value E represents the square root of the variance of the estimated value of the actual imbalance. It is related to the mean magnitude of the residual phase error after compensation.

In FIG. 5, the conditions considered correspond to 4 paths, a velocity of 3 km/h and Iorx/Ioc=−3 dB.

In FIG. 6, the conditions considered correspond to 4 paths, a velocity of 120 km/h and Iorx/Ioc=−3 dB.

In FIG. 7, the conditions considered correspond to 4 paths, a velocity of 250 km/h and Iorx/Ioc=−3 dB.

All three simulations show very good results for E for a filter length of low pass filter 2 in FIG. 1 of more than 50 pilot symbols or a phase error of more than 2 degrees.

Figure 8:
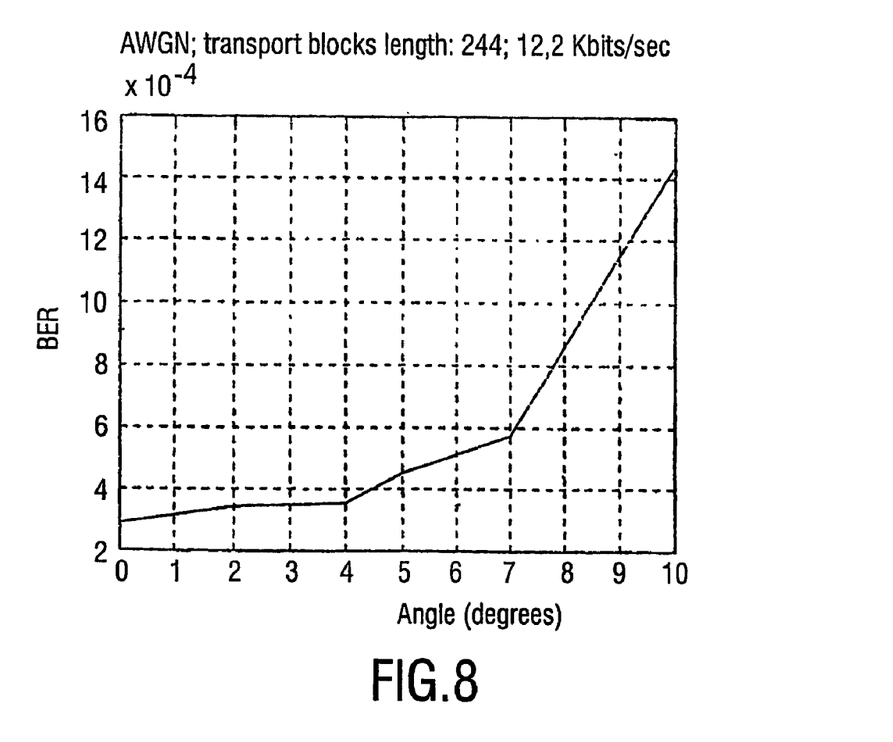
FIG. 8 shows the effect of the phase imbalance on the BER.

FIG. 8 shows the effect of the phase imbalance on the BER (Bit-Error Rate) in a case in which AWGN propagation conditions (Additive White Gaussian Noise) are considered and no other losses are included. Between 0 and 4 degrees the BER increases rather slowly. From 4 to 7 degrees, the increase of the BER is moderate and from 7 to 10 degrees, the BER increases fast. As can be seen in the range 0-5 degrees, the phase imbalance can imply an increase in the BER of about 60%.

Figure 9:
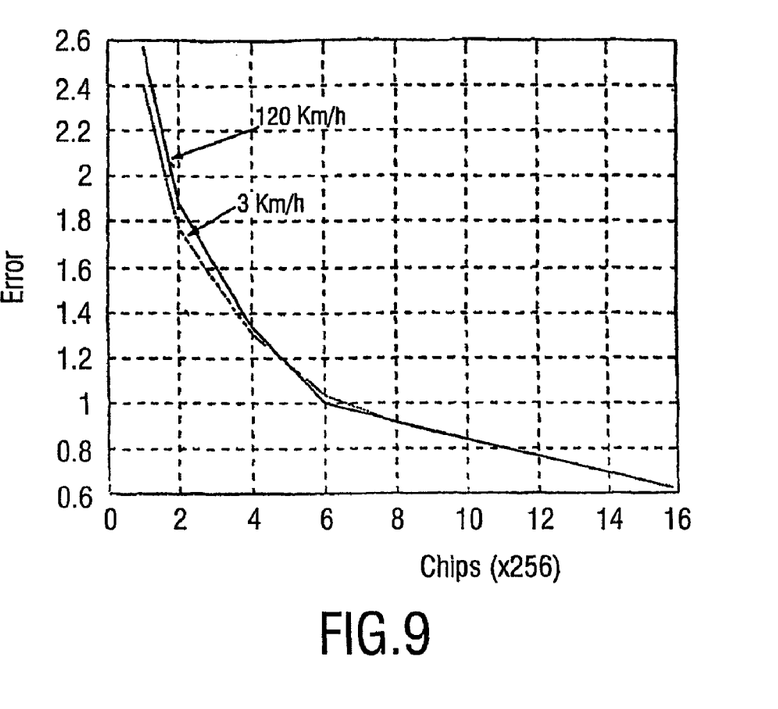
FIG. 9 shows simulation results for the square root error for 5 degrees initial phase error vs. low pass integration length.

FIG. 9 shows the performance which can be achieved in typical conditions. The phase error decreases exponentially with the integration length. By choosing an integration length of 16×256 chips, corresponding to 16 pilot symbols, the phase error is reduced in mean of the 90%.

Figure 10:
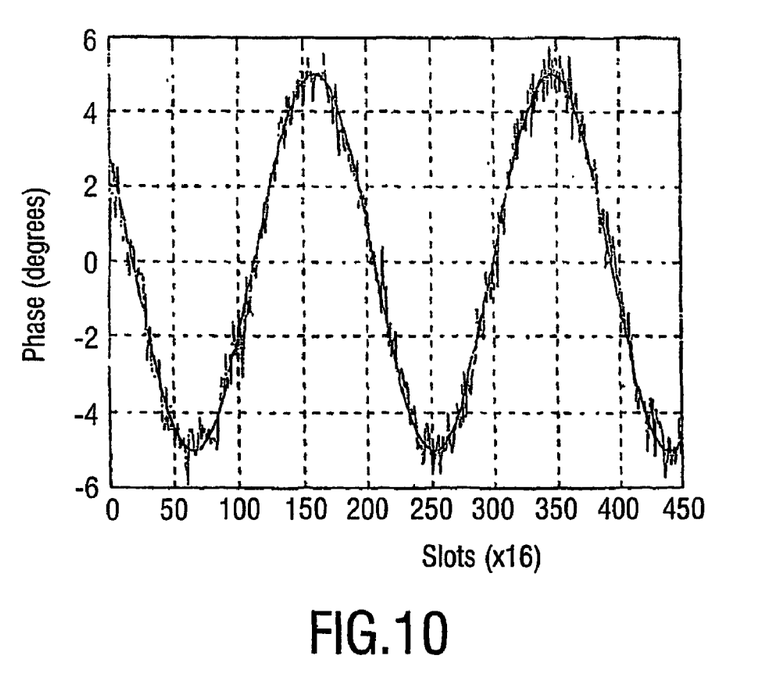
FIG. 10 shows an estimation for a time varying phase (5 Hz).

FIG. 10 shows results related to a case in which the phase is changing at a fixed frequency of 5 Hz. This case is used to give a representation of the tracking capability of the method. The conditions considered correspond to 4 paths and a velocity of 120 km/h. The effect of the noise is included, inter-cells interference at +3 dB with respect to the desired signal. The integration period is 16 slots and the mean square error achieved is 0.57 on a peak phase error of 5 degrees.

FIGS. 11 and 12 show the performances of the iterative procedure applied when both phase and gain imbalance are present. FIG. 11 shows an estimated phase with speed=3 km/h and 3 equivalent paths in the iterative application of the method at the location indicated with arrow 44 in FIG. 4. The initial condition for the gain imbalance is 0.8 and 5 degrees for the phase. The term $k_3$ in the equations (18) is equal to 0.5.

FIG. 1 shows the error for the gain with speed=3 km/h and 3 equivalent paths in the iterative application of the method at the location indicated with arrow 44 in FIG. 4. The initial condition for the gain imbalance is 0.8 and 5 degrees for the phase. The term $k_3$ in the equations (18) is equal to 0.5

As can be taken from FIGS. 11 and 12, after approximately 300 pilot symbols, i.e., 2 frames corresponding to an interval of 20 msec, errors of 5 degrees in phase and 0.8 in gain are reduced to about 0.02 degrees for the phase and 0.01 for the gain.

The method and device of the present invention is particularly well suited for UMTS/WCDMA, where a complex scrambling code is used to modulate the information symbols. However, the method and device of the present invention may also be applied for any transmission with QPSK modulation, a modulation scheme based on a complex scrambling code and a frequency selectivity of the channel with respect to transmission bandwidth.

The device according to the present invention may be designed by means of EPLDs, such as the Altera EPLDs or by means of suitable calculation devices. The methods of the present invention may be implemented as software program code in a suitable programming language such as C++ and stored on a suitable computer readable storage device such as a compact disc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A receiver for estimation and compensation of phase imbalance or gain imbalance, the receiver comprising:

a first circuit structured to estimate the phase imbalance or gain imbalance of I and Q components of an incoming complex signal prior to symbol synchronization, the first circuit structured to generate as an output a ratio of the product of compensated I and Q components and the square of the compensated I component, the first circuit including a first multiplier structured to receive the compensated I and Q signals and to generate a product thereof, and a second multiplier structured to generate the square of the compensated I component, a divider structured to divide the product of the first multiplier by the product of the second multiplier, and an integration circuit that is structured to integrate the output of the divider and to output an integration signal; and a second circuit structured to receive as inputs the uncompensated I and Q components and the output of the first circuit and to output on output terminals the compensated I and Q components.

2. The receiver of claim 1, wherein the first circuit is structured to receive as inputs the I and Q components of the complex signal after demodulation and compensation.

3. The receiver according to claim 1, wherein the first circuit comprises a low pass filter structured to low pass filter the product of the compensated I and Q components and low pass filter the square of the compensated I component.

4. The receiver of claim 1, comprising a synchronizer having input terminals coupled to the output terminals of the second circuit, the synchronizer comprising a UMTS synchronizer.

5. A circuit comprising:

a first circuit having a first multiplier structured to receive I and Q components of an incoming I/Q modulated signal and a second multiplier structured to receive the I component, and a first divider circuit structured to divide an output of the first multiplier by an output of the second multiplier, the first circuit structured to generate as an output a ratio between a cross correlation of the I and Q components and a mean value of a square of the I component;

a second circuit structured to receive an integration signal from the divider circuit and to receive uncompensated I and Q components of the incoming I/Q modulated signal, and to output on an output terminal of the circuit compensated I and Q components; and a third circuit having a multiplier structured to receive the Q component, and a second divider circuit structured to receive an output of the second multiplier of the first circuit and an output of the multiplier of the third circuit, and further structured to generate as an output a ratio between the output of the second multiplier of the first circuit and the output of the multiplier of the third circuit.

6. The circuit of claim 5, wherein the first circuit is structured to receive as inputs the I and Q components of a complex signal after demodulation and compensation.

7. The circuit of claim 5, wherein the first circuit comprises a low pass filter structured to low pass filter the output of the first multiplier and a low pass filter structured to filter the output of the second multiplier, the divider circuit having inputs structured to receive the output of both low pass filters.

8. the circuit of claim 5, comprising a synchronizer having input terminals coupled to output terminals of the second circuit, the synchronizer comprising a UMTS synchronizer.

\* \* \* \* \*

UNITED STATES PATENT AND TRADEMARK OFFICE
CERTIFICATE OF CORRECTION

PATENT NO. : 8,036,317 B2
APPLICATION NO. : 10/536641
DATED : October 11, 2011
INVENTOR(S) : D'Alessandro It is certified that error appears in the above-identified patent and that said Letters Patent is hereby corrected as shown below:

In The Drawings

In Fig. 2, Sheet 2 of 8, for Tag "25", insert -- Integrator --.

In The Specification

In Column 1, Line 54, delete "allows the" and insert -- allows for the --, therefor.

In Column 2, Line 57, delete "It may be seen as a gist of the present invention that the" and insert -- Preferably according to the present invention, the --, therefor.

In Column 5, Lines 48-50, delete "$<I_i\cdot Q_j> = <g_i\cdot g_j> \cdot <i_i,i_j> \cdot <-\sin(\phi_i)\cos(\phi_j)> + <g_i\cdot g_j> \cdot <q_i,q_j> \cdot <\sin(\phi_i)\cos(\phi_j)> - <g_i\cdot g_j> \cdot <i_i,q_j> <\sin(\phi_i) \sin(\phi_j)> + <g_i\cdot g_j> \cdot <q_i\cdot i_j> <\cos(\phi_i)\cdot\cos(\phi_j)>$" and insert -- $<I_i\cdot Q_j> = <g_i\cdot g_j> \cdot <i_i,i_j> \cdot <-\sin(\varphi_i) \cos(\varphi_j)> + <g_i\cdot g_j> \cdot <q_i\cdot q_j> \cdot <\sin(\varphi_i) \cos(\varphi_j)> - <g_i\cdot g_j> \cdot <i_i\cdot q_j><\sin(\varphi_i) \sin(\varphi_j)> + <g_i\cdot g_j> \cdot <q_i\cdot i_j><\cos(\varphi_i) \cdot \cos(\varphi_j)>$ --, therefor.

In Column 8, Line 8, delete "pass 23," and insert -- pass 24, --, therefor.

In Column 11, Line 50, delete "$<I^2> - <Q^2> = <i^2>\left(k_1^2 - k_3^2 sen^2\varphi\right) - k_2^2 q^2 \cos\varphi$" and insert -- $<I^2> - <Q^2> = <i^2>\left(k_1^2 - k_3^2 \sin^2\varphi\right) - k_2^2 q^2 \cos\varphi$ --, therefor.

In Column 12, Line 28, delete "pass 2" and insert -- pass 12 --, therefor.

Signed and Sealed this
Thirty-first Day of May, 2016

Michelle K. Lee
*Director of the United States Patent and Trademark Office*

CERTIFICATE OF CORRECTION (continued)
U.S. Pat. No. 8,036,317 B2

In Column 12, Line 30, delete "filter 1" and insert -- filter 12 --, therefor.

In Column 12, Line 42, delete "filter 2" and insert -- filter 12 --, therefor.

In The Claims

In Column 14, Line 54, in Claim 8, delete "the" and insert -- The --, therefor.